(12) United States Patent
Cericola et al.

(10) Patent No.: US 7,352,850 B1
(45) Date of Patent: Apr. 1, 2008

(54) OFFLOADING DATA TRAFFIC FROM FACILITIES DESIGNED TO HANDLE VOICE CALL TRAFFIC

(75) Inventors: Ellen R. Cericola, Warrington, PA (US); Nick T. Davis, Warrenton, VA (US); Bradley J. Frison, Vienna, VA (US); Harry A. Hetz, Silver Spring, MD (US); Kathleen F. Jarosinski, Baltimore, MD (US); David George Morris, Boston, MA (US)

(73) Assignee: Verizon Services Corp., Arlington, VA (US)

( * ) Notice: Subject to any disclaimer, the term of this patent is extended or adjusted under 35 U.S.C. 154(b) by 1314 days.

(21) Appl. No.: 10/180,398

(22) Filed: Jun. 26, 2002

(51) Int. Cl.
*H04M 15/00* (2006.01)
*H04L 12/66* (2006.01)
*H04J 1/02* (2006.01)

(52) U.S. Cl. .................... 379/112.05; 379/112.08; 370/352; 370/354; 370/401; 370/402

(58) Field of Classification Search .......... 379/112.01, 379/112.05, 112.08, 221.01, 221.08, 219 379/230; 370/349, 352, 389, 392, 401, 461–462, 370/468, 354, 402
See application file for complete search history.

(56) References Cited

U.S. PATENT DOCUMENTS

| 6,154,465 | A  | * | 11/2000 | Pickett ........................ 370/466 |
| 6,181,694 | B1 | * | 1/2001  | Pickett ........................ 370/353 |
| 6,208,658 | B1 | * | 3/2001  | Pickett ........................ 370/401 |
| 6,442,169 | B1 | * | 8/2002  | Lewis ......................... 370/401 |
| 6,560,222 | B1 | * | 5/2003  | Pounds et al. ............... 370/353 |

OTHER PUBLICATIONS

"Carrier-Deployable Convergence," Rapid5 Networks, 14 pgs. no date.
"Advancing the All-Packet Network," Rapid5 Networks, 18 pgs. no date.
"The Environment for Convergence," Sonus Networks, 6 pgs. no date.
"ipVerse ControlSwitch," ipVerse, 4 pgs. no date.
"ControlSwitch," ipVerse, 6 pgs. no date.
"Solutions," ipVerse, downloaded from: http://www.ipverse.com/products/solution.html on Nov. 1, 2001, pp. 1-4.
"The Next Generation is Here . . . Now," Sonus Networks, downloaded from: http://www.sonusnet.com/Products/index.cfm?id=6 &looking=INtelligentIP%20Softswitch.html on Nov. 1, 2001, pp. 1-3.
"Sonus Networks. The Voice Infrastructure Solution," Sonus Networks, downloaded from: http://www.sonusnet.com/Products/index.cfm on Nov. 1, 2001, 1 pg.
"Product Overview," Sonus Networks, downloaded from: http://www.sonusnet.com/Products/index.cfm?id=3 &looking=Product%20Overview on Nov. 1, 2001, pp. 1-5.
"Product Architecture," ipVerse, downloaded from: http://www.ipverse.com/products/architecture.html on Nov. 1, 2001, pp. 1-2.

* cited by examiner

*Primary Examiner*—Binh K. Tieu (57) ABSTRACT

An (e.g., primary rate interface) offload device used relieve switches designed and engineered to carry short duration voice telephone calls, from servicing other types of calls (such as modem-based Internet calls), such as calls to a remote access server. Security is enhanced by isolating signaling and data communications. Such isolation may be provided by the use of separate networks, or a network with appropriate firewalls.

22 Claims, 8 Drawing Sheets

OFFLOADING DATA TRAFFIC FROM FACILITIES DESIGNED TO HANDLE VOICE CALL TRAFFIC

§ 1. BACKGROUND OF THE INVENTION

§1.1 Field of the Invention

The present invention concerns providing communications services to high-usage customers, such as Internet service providers and enterprise customers for example.

§1.2 Related Art

Historically, the facilities of telephone service providers, such as regional bell operating companies (or "RBOCs"), were designed to handle telephone call traffic, and were engineered based on statistical usage information. Historically, most telephone calls were relatively short. As is known to those skilled in the art, voice telephone calls were, and are, carried out over so-called "circuit switched" networks in which a circuit between parties to a call is set up and maintained for the duration of a call.

Relatively new classes of high usage telephone service customers, such as Internet and on-line service providers and enterprise customers for example, have changed the type, quantity, and usage patterns of communications over the facilities of telephone service providers. For example, Internet service providers ("ISPs") or enhanced service providers ("ESPs") have experienced explosive growth over the 1990s as customers desire access to the Internet and proprietary networks. Moreover, this growth is expected to continue. Rather than short duration voice calls, ISPs and ESPs typically require longer duration, data calls. As a second example, many enterprises want telecommuter employees, mobile workers, partners, suppliers, and/or occasional dial in users to be able to access various services from locations remote from the enterprise. This has led to such enterprises employing so-called "remote access servers" to facilitate such remote access. The growth in this area has been robust recently. Furthermore, other services, such as on-line banking and commerce, are expected to add to this growth.

Much of the foregoing services involve the exchange or downloading of data. Although so-called packet-switched networks can typically communicate such data more efficiently and cheaply than circuit-switched networks, much of these communications occur via modems over circuit-switched networks. The service providers or enterprises typically use so-called remote access server ("RAS") or network access server (NAS) equipment to terminate such modem-based traffic and to convert such traffic into a form suitable for use on packet networks, such as Internet protocol ("IP") networks. Currently, the service providers and enterprises often lease ISDN-PRI (Integrated Services Digital Network-Primary Rate Interface) lines. PRIs are 1.544 Mbps services that provide 23 64 Kbps data channels and one 64 Kbps control channel.

Figure 1A:
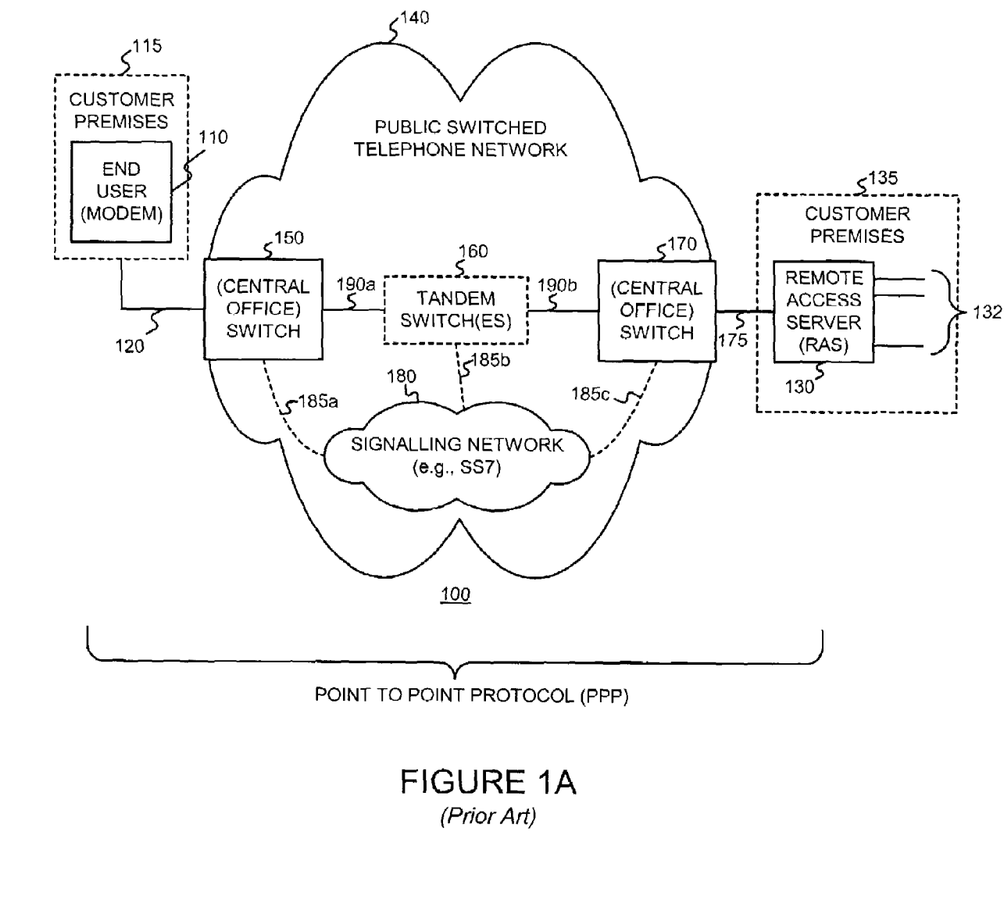
FIGS. 1A and 1B are block diagrams of known environments for providing communications services to high-usage customers.

FIG. 1A illustrates a first environment 100 in which a first customer 115 access the Internet or an enterprise computer facility 135 via a public switched telephone network ("PSTN") 140. The first customer, at its premises 115, can use a modem 110 to access a remote access server ("RAS") 130 at the premises 135 of an ISP, ESP, or enterprise for example. The public switched telephone network 140 can set up, provide transport for, and terminate a call between the modem 110 and the remote access server 130. More specifically, the modem 110 may communicate with an ingress (central office) switch 150 via a local loop (e.g., twisted copper pair) 120. The ingress switch 150 may be a so-called class 5 switch, such as the 5ESS from Lucent of Murray Hill, N.J. The ingress switch may use a signaling network 180, such as signaling system 7 ("SS7"), to set up and terminate the call. On the egress side, the remote access server 130 may communicate with an egress (central office) switch 170 via PRI lines 175. Lines 132 from the remote access server 130 typically carry data in an appropriate communicates protocol, such as IP or Ethernet for example. Calls between the ingress switch 150 and the egress switch 170 travel over direct trunk links 190 between these switches, or via one or more tandem switch 160. Typically, inter-switch trunk lines carry calls that have been time-division multiplexed. Signaling lines 185 may be used to communicate signaling information (e.g., used to set up and terminate calls) between the various switches and a signaling network 180.

Figure 1B:
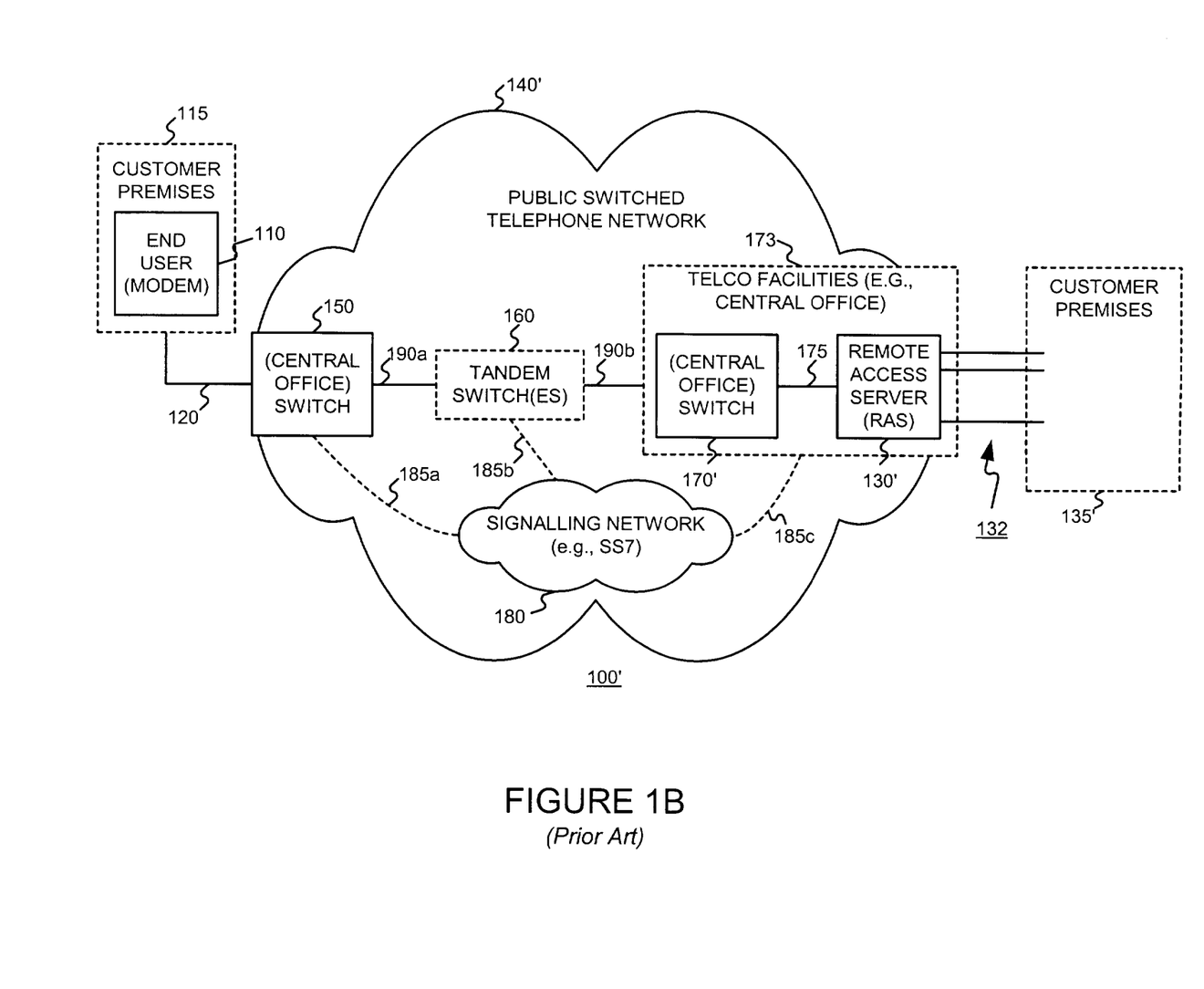

In the first environment of FIG. 1A, the remote access server 130 was located at the customer (e.g. ISP, ESP, or enterprise) premises 135. Alternatively, as shown in FIG. 1B, the remote access server 130 may be provided at the facilities (e.g., central office 173) of the telephone service provider, rather than at the customer premises 135'.

The explosive growth in areas such as Internet access and remote enterprise access, coupled with the typical usage patterns of these new areas, has created unique service delivery challenges for regional bell operating companies and other telephone service providers. Although leasing ISDN-PRI lines can generate considerable revenue, modem traffic is a disruptive burden on switches designed to carry short duration, voice call traffic, not long duration, data call traffic. More specifically, the costs associated with processing so-called "Internet calls" are high, and in some cases, do not generate per-call revenue. Furthermore, the egress switch may need to commit processing resources to convert signaling protocols (e.g., SS7 to ISDN-PRI).

Some so-called soft-switch companies (e.g., ipVerse, Sonus, Level3 (See, e.g., http://www.level3.com/us/index.html)) have proposed various solutions for offloading PRIs. For example, ipVerse has proposed using its softswitch to control, via an IP network, a media gateway for converting DS3 IMTs to PRIs. See, e.g., the white paper "Integrated Communications Provider (ICP) Business Opportunity: Converting ISDN-PRI Lines to a Profit Center for Lease Line and Modem Wholesale Service," FIG. 3. This scheme is summarized in FIG. 2.

Figure 2:
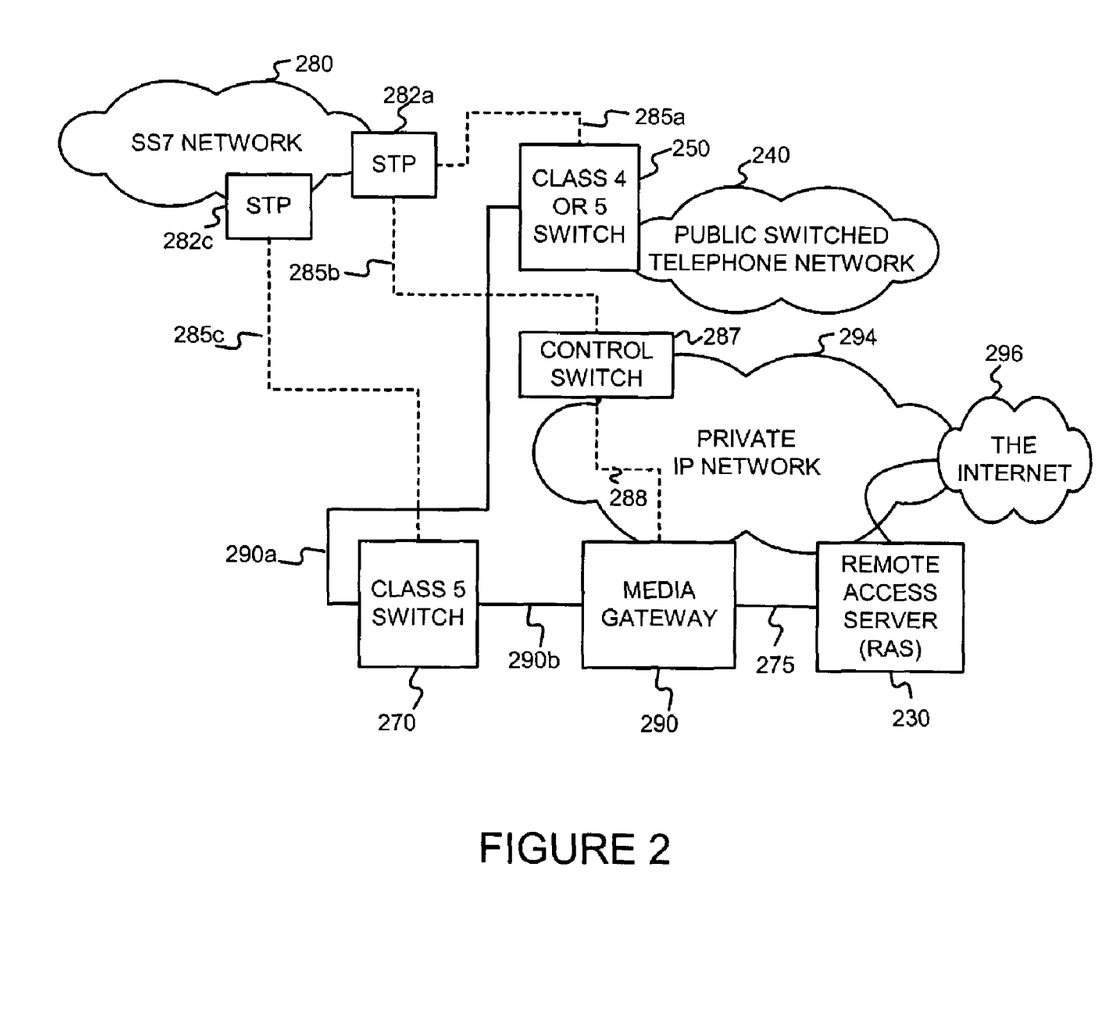
FIG. 2 is a block diagram of a proposed solution of using a soft-switch to control the offload of high usage communications.
Figure 8A:
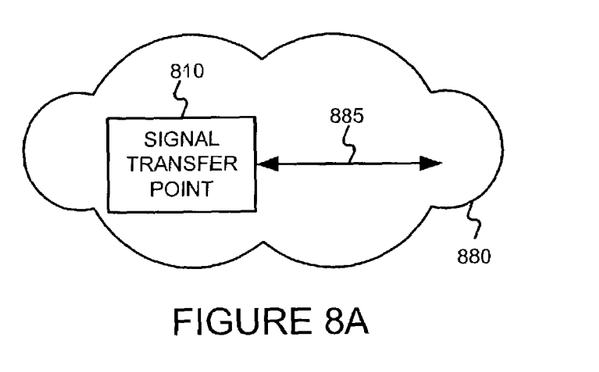
FIGS. 8A and 8B illustrate ways of securely communicating with a signaling interface used in the embodiments of the present invention illustrated in FIGS. 3 and 4.
Figure 8B:
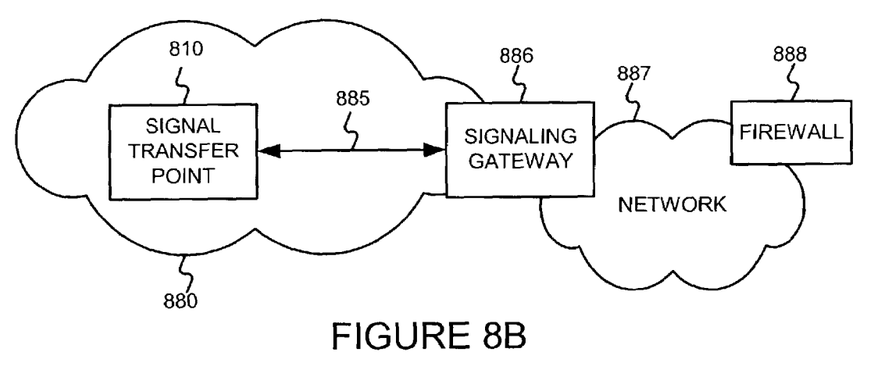

As shown in FIG. 2, PRIs 275 are provided to a remote access server 230 via a media gateway 290. The media gateway 290 terminates inter-machine trunk lines 290b from switch 270. An SS7 network 280 has signaling transfer points (STPs) 282 which control switches 250, 270, as well as control switch (a soft-switch) 287, as indicated by dashed lines 285. The control switch (a soft-switch) 287 controls calls to the media gateway 292 as indicated by dashed line 288. Referring to FIG. 8B, the control switch 287 is preferably separate and distinct from the signaling gateway 886. Preferably, the signaling gateway 886 only performs signaling translation functions between SS7 and IP signaling protocols.

Although this architecture diverts long call duration traffic, such as modem traffic for example, from class 5 switches to a media gateway, it will not be acceptable to many in view of potential security problems. More specifically, as can be appreciated from FIG. 2, an IP network 294 is used for both (1) communicating control information between the control switch (a soft-switch) 287 and the media gateway 290, and (2) communicating data between the remote access server 230 and the Internet 296. Providing both control and data communications over the same network is disadvantageous from a security point of view. Moreover, IP networks, such as 294, are more prone to hacking, particularly if they are not protected by a firewall (though some enterprise business will have firewall protection). The fact that the IP network 294 is coupled with the Internet 296 exacerbates this problem. For example, a hacker anywhere in the world could use the Internet 296 to access the private IP network 294, and ultimately the control switch 287. Unauthorized access to the control switch 287 has serious consequences. Even if separate IP networks were used, media gateways are, relatively speaking, easy to breach. For all of these reasons, using an IP network to communicate control signaling to a media gateway, let alone an IP network coupled with the Internet, is simply not acceptable to many. On the other hand, the SS7 network 280 is effectively isolated from the Internet 296 and is considered by most to be a "trusted" network environment.

There remains, therefore, a need to relieve switches designed and engineered to carry short duration voice telephone calls, from servicing other types of calls (such as modem-based Internet calls) that differ (e.g., in length and type) from typical voice telephone calls. Any solution should have appropriate security safeguards.

§ 2. SUMMARY OF THE INVENTION

The present invention provides apparatus, including a converter and a signaling interface, for offloading calls to high usage customers. The converter has a first interface for terminating an inter-machine trunk and a primary rate interface, and is adapted to convert data signals received on the first interface to new data signals for placement on the primary rate interface. The signaling interface is adapted to establish a call, through the converter, from a first terminal device to a second terminal device. The signaling interface communicates via a signaling network that is isolated from a network for carrying the new data signals.

The apparatus may also include a remote access server adapted to terminate data calls or modem calls, or adapted to convert new data signals to an Internet protocol. If the remote access server is coupled to an Internet protocol network, the Internet protocol network may be isolated from the signaling network.

The present invention also provides a method for servicing a call to a remote access server. The method includes (a) setting up the call, using a signaling network, such that the call passes through a primary rate interface, and (b) converting, using the primary rate interface, the call from a time-division multiplexed signal on an inter-machine trunk to a primary rate signal. The inter-machine trunk is a part of a communications network, and the communications network is isolated from the signaling network.

The method may further insert the primary rate signal as data into Internet protocol packets and may also provide the Internet protocol packets to an Internet protocol network isolated from the signaling network.

The apparatus and method permit the call to bypass an egress central office switch.

§ 4. DETAILED DESCRIPTION

The present invention involves novel methods, apparatus, message formats and data structures for diverting long duration calls, such as modem calls, from class 5 switches and/or tandem switches, while maintaining a high degree of security. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as the following disclosed methods, apparatus, message formats and data structures and any other patentable subject matter.

In the following, environments in which the present invention may operate are described in § 4.1. Then, exemplary embodiments of the present invention are described in § 4.2. An example of operations of an exemplary embodiment of the invention is then provided in § 4.3. Finally, some conclusions regarding the present invention are set forth in § 4.4.

§ 4.1 ENVIRONMENTS IN WHICH THE PRESENT INVENTION MAY OPERATE

Figure 3:
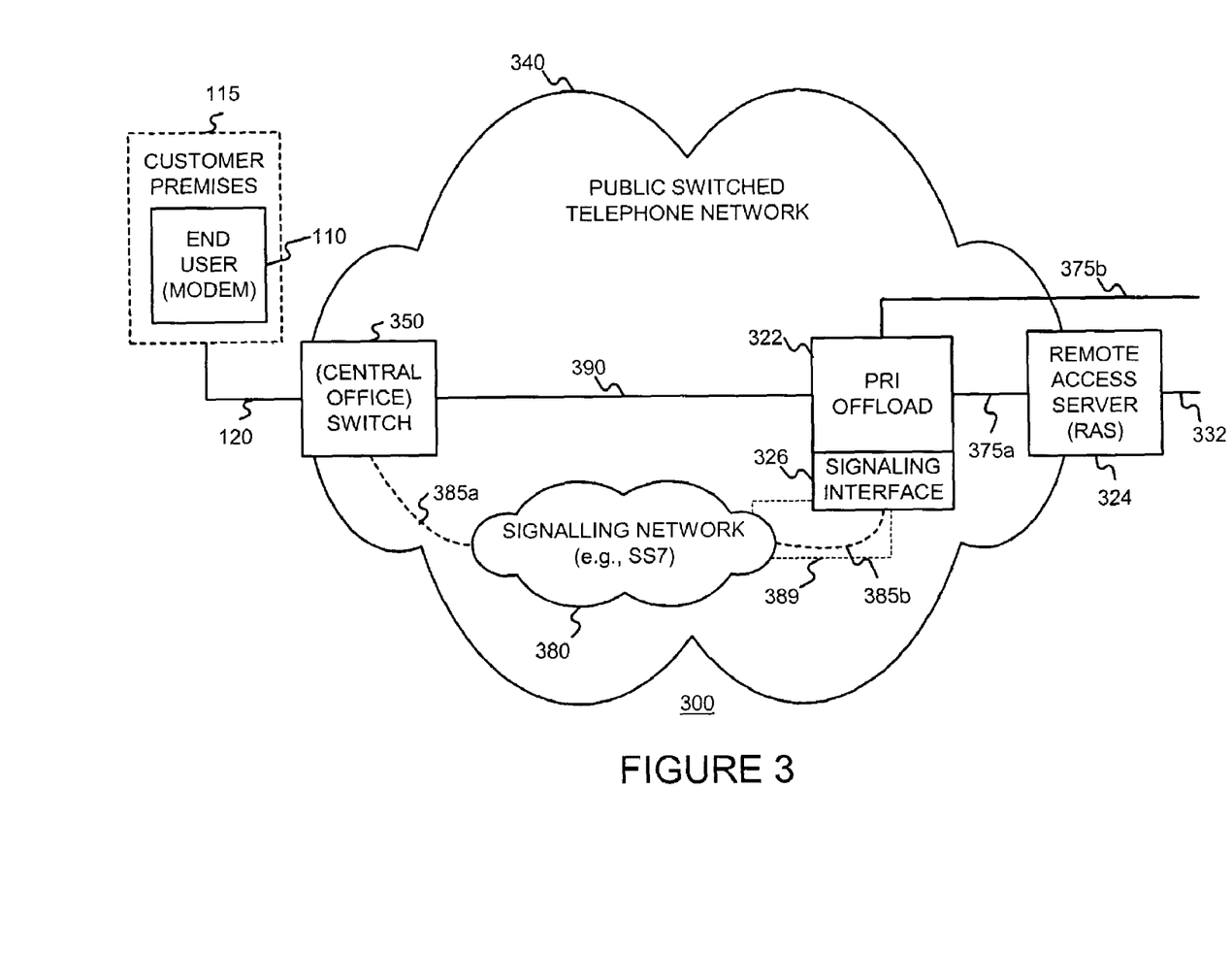
FIG. 3 is a block diagram of a first embodiment of the present invention, shown in the context of a communications environment.
Figure 4:
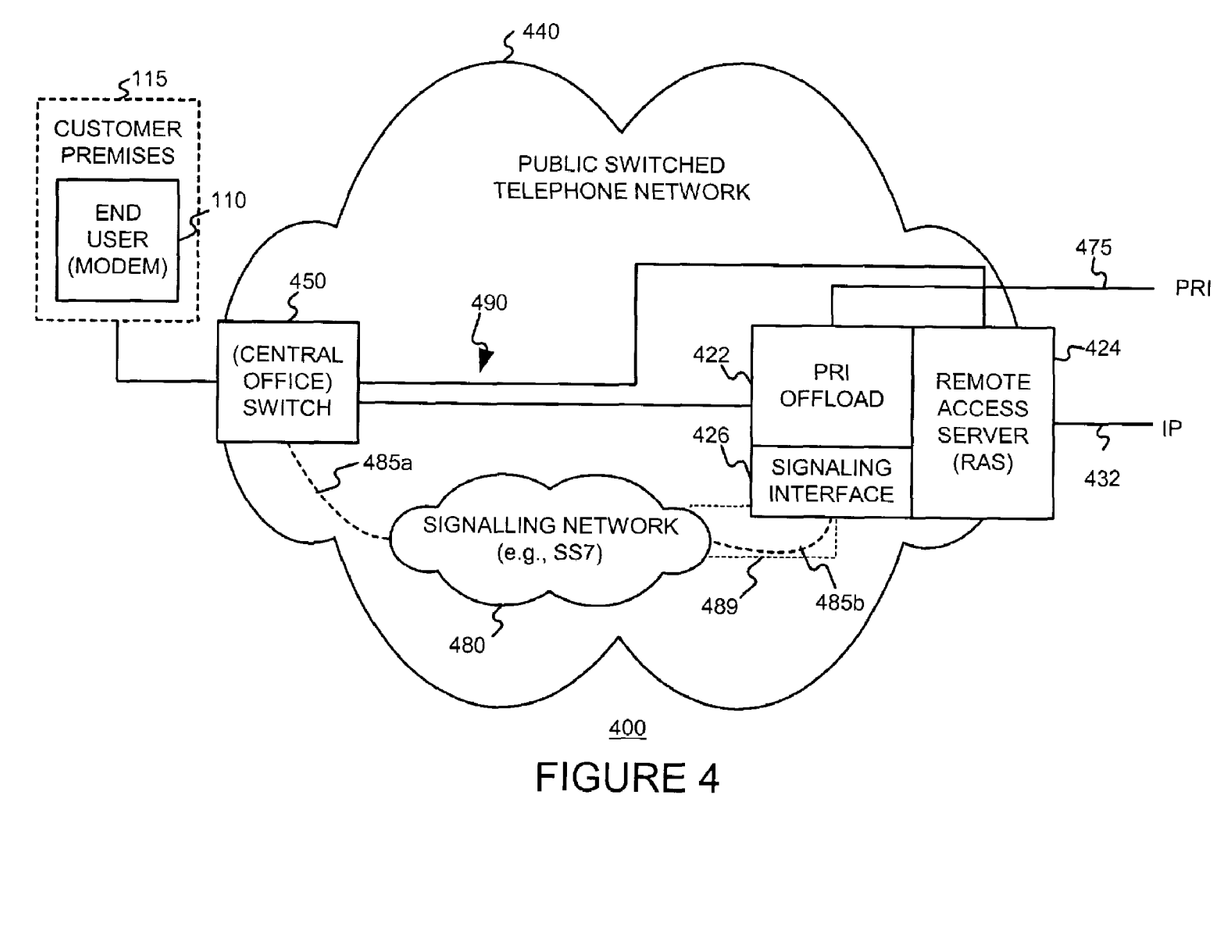
FIG. 4 is a block diagram of a second embodiment of the present invention, shown in the context of a communications environment.

The present invention may be a part of, or may be used with, a transport network, such as the public switched telephone network ("the PSTN") for example. Referring to FIGS. 3 and 4, as is known, the PSTN may include one or more central office switches 350, 450 which provide access points to customer premises 115. Terminal devices, such as a telephone or modem 110 for example, may access a central office switch 350, 450 via some form of access infrastructure 120. This access infrastructure 120, commonly referred to as the "local loop", may be twisted pair copper wire, optical fiber, coaxial, and some wireless technology, etc. Within the PSTN 140, 340, 440, central office switches may be interconnected via inter-machine trunks ("IMTs") 190, 390, either directly, or via so-called tandem switches 160. The PSTN 340, 440 may also include a signaling network 380, 480, such as signaling system 7 ("SS7") for example, for setting up, maintaining, and terminating calls.

The present invention is especially useful for serving customers that terminate a lot of long duration calls (referred to as "high usage customers"). An example of such a high usage customer is an Internet service provider ("ISP"), such as America On Line. (Note that although many individuals can themselves generate long duration calls, for example to their ISP, such calls are generally not concentrated at a single central office, but rather, are distributed to such an extent that they aren't a major problem.) Since central office switches are typically engineered to handle relatively short duration calls, serving such high usage customers with such central office switches causes problems. Although it is possible to reengineer such central office switches to handle many longer duration calls, this option is not attractive due to the relatively high costs of the these central office switches and access limitations due to lower call handling ratios.

The present invention may be used to divert calls from an egress central office switch (and perhaps even tandem switches).

§ 4.2 EXEMPLARY EMBODIMENTS

FIGS. 3 and 4 illustrate two alternative embodiments of the present invention. As shown in FIG. 3, in the network 300, a PRI offload device 322 is used to terminate an IMT 390 from central office switch 350. Although not shown, the PRI offload device 322 can terminate more than one IMT 390 from the central office switch 350, and can terminate one or more other IMTs from one or more other central office switches or tandem switches. A signaling interface 326 is used, in conjunction with the signaling network 380, to set up, maintain, and/or terminate a call between any party and a high-usage customer (not shown).

The PRI offload device 322 may provide a PRI line(s) 375a to a remote access server (RAS) 324 and/or PRI line(s) 375b to other devices (not shown). The RAS 324 may be used to convert the data on the PRI line(s) 375a to a form appropriate for a packet (e.g., Ethernet, IP, etc.) network. For example, each PRI line may include 23 data channels. Each of these data channels could be applied to a port (having a particular address) of the RAS.

The second embodiment shown in FIG. 4 is similar to the embodiment shown in FIG. 3, except that the RAS 424 is provided with an integrated PRI offload device 423, thereby eliminating the need to provide PRI line(s) between them.

Notice that in both cases, a network for communicating control signals (e.g., 380/385 or 480/485) is isolated from a network for communicating data, such as the Internet 332 or 432 for example. In the embodiments shown, this isolation is ensured by providing separate networks. For example, referring to FIGS. 3, 4 and 8A, elements within dashed lines 389/489 may include a signal transfer point 810 and a link (e.g., an SS7 A link) 885, both of which belong to the signaling (e.g., SS7) network 880. However, in alternative embodiments of the present invention, both data, control, and management can be communicated over the same network, provided that appropriate isolating security elements, such as firewalls for example, are provided. For example, referring to FIGS. 3, 4, and 8B, elements within dashed lines 389/489 may include a signal transfer point 810, a link (e.g., an SS7 A link) 885, a signaling gateway device 886, an additional network 887, and a firewall device 888. Both the signal transfer point 810 and the link 885 may belong to the signaling (e.g., SS7) network 880. The signaling gateway 886 may span the signaling network 880 and the network 887. The firewall 888 may be provided between the network 887 and the signaling interface 326/426. The signaling gateway 886 may also be provided with a firewall (not shown). In this embodiment, even if the network 887 is used for both data and signaling, the signaling network 880 and signaling interface 326/426 are secured by firewalls. In one method, SS7 messages can be encrypted (and time stamped), thereby providing security gatekeeper functions to the SS7 network. See U.S. application Ser. No. 09/767,292, entitled "METHOD OF AND APPARATUS FOR AUTHENTICATING CONTROL MESSAGES IN A SIGNALING NETWORK", filed on Jan. 18, 2001. (That application is incorporated herein by reference.) The security function described in that application could be extended to the PRI-RAS gateway, thereby linking security across the signaling (SS7) network—data (IP) network boundary.

Figure 5:
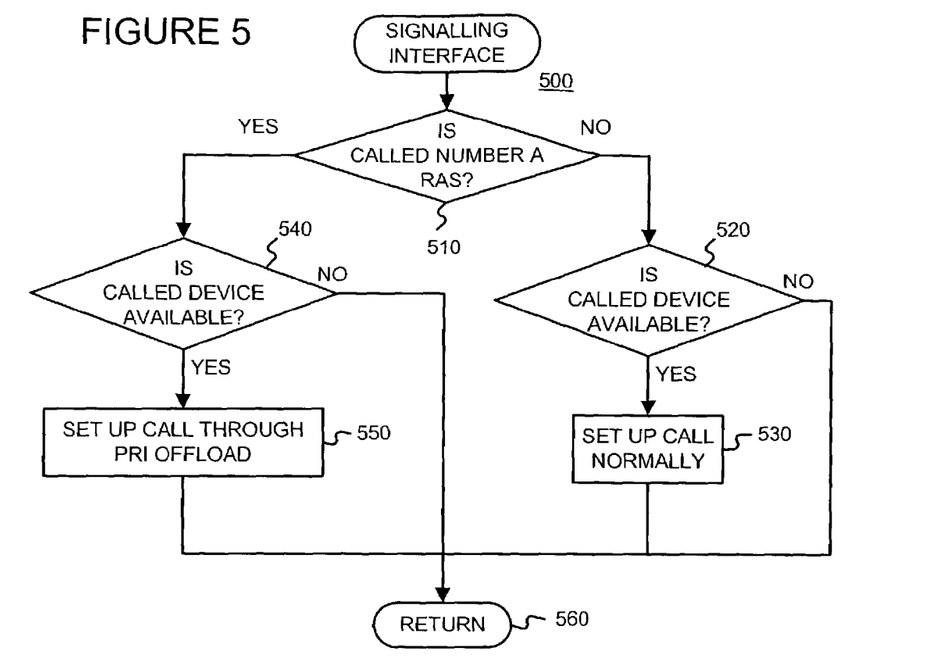
FIG. 5 is a flow diagram of an exemplary signaling interface method that may be used in the present invention.

FIG. 5 is a flow diagram of an exemplary signaling interface method 500 that may be used in the present invention. First, as indicated by decision block 510, it is determined whether or not a called number is a RAS (or some other high usage customer terminating device). This determination may be made within the signaling network 380, 480. For example, an advanced intelligent network ("AIN") database used by the signaling network 380,490 may include such information. If, on the one hand, the called number is not a RAS, then the call is processed normally. For example, as indicated by decision block 520 and block 530, if the called device is available (i.e., connected and not busy), the call is set up, before the method 500 is left via RETURN node 560. Referring back to decision block 510, if the called number is a RAS, then, as indicated by decision block 540 and block 550, if the called device is available, then the call is set up through the PRI offload device, before the method 500 is left via RETURN node 560.

Figure 6:
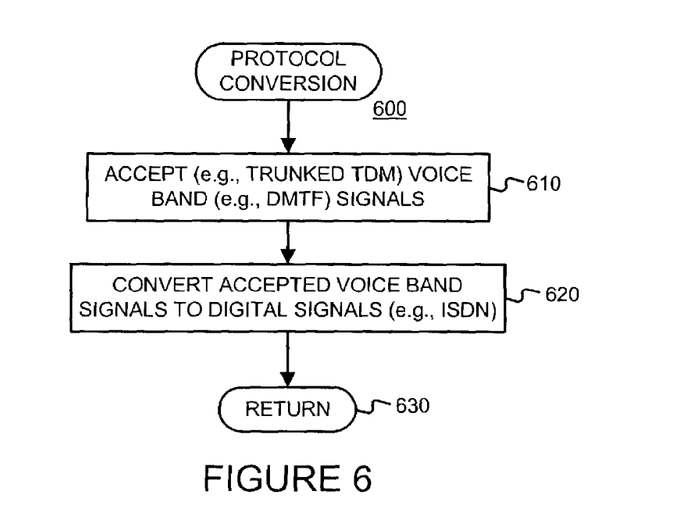
FIG. 6 is a flow diagram illustrating protocol conversion that may take place in a PRI offload device.

FIG. 6 is a flow diagram of an exemplary protocol conversion method 600 that may be used in the PRI offload device 322, 422. As indicated by block 610, voice-band signals are accepted (e.g., terminated). In the case of modem calls, these voice-band signals may be dual-tone multiple-frequency ("DTMF")(used for call establishment) signals. Such signals may be time-division multiplexed ("TDM") onto inter-machine trunks ("IMTs"). Then, as indicated by block 620, the accepted voice-band signals are converted into digital signals. These digital signals may be provided as integrated digital services network ("ISDN") signals. The method 600 may then be left via RETURN node 630.

Figure 7:
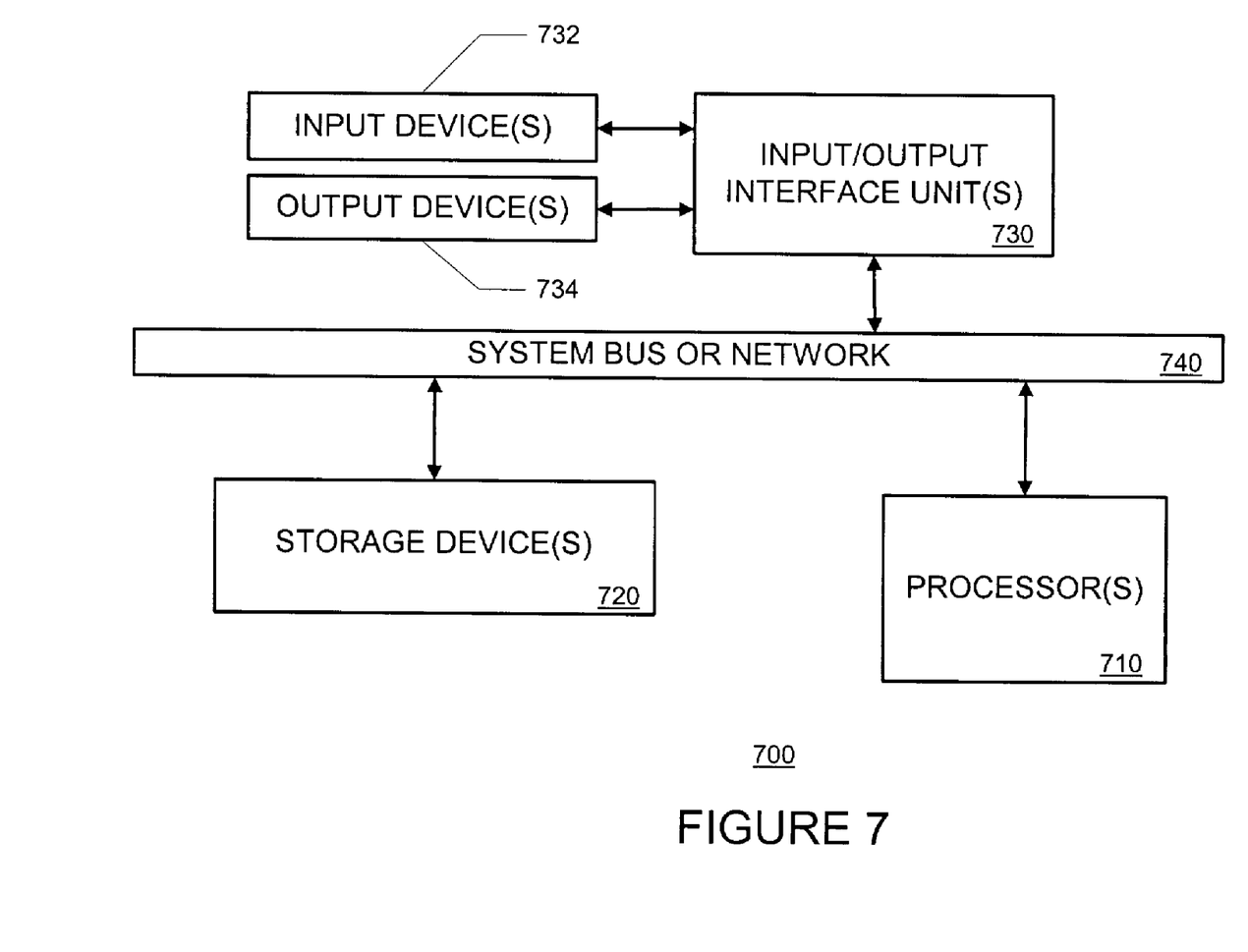
FIG. 7 is a block diagram of an exemplary apparatus that may be used to effect various aspects of the present invention.

These and other methods performed by the present invention may be effected by hardware, and/or machine executed instructions. FIG. 7 is a block diagram of a machine 700 on which at least some aspects of the present invention may be effected. The machine 700 may include a processor(s) (e.g., a microprocessor) 710, a storage device(s) 720 (such as RAM, ROM, magnetic, optical, and/or magneto-optic disks, and magnetic tape for example), input/output interfaces 730, an input device(s) 732 (such as IMT or PRI terminating interfaces for example), an output device(s) 734 (such as PRI or IP terminating interfaces for example), and a system bus or network 740. The processor(s) 710, input/output interface(s) 730, and storage device(s) 720 may communicate with one another via the system bus or network 740. The program instructions may be stored on the storage device(s) 720 and/or received via the input/output interface unit(s) 730. In one embodiment, the machine 700 may be accommodated on a line card.

§ 4.3 EXAMPLES ILLUSTRATING OPERATIONS OF EXEMPLARY EMBODIMENTS

In the following examples, it is assumed that a user with a dial-up modem places a call to an Internet service provider ("ISP") having a remote access server ("RAS") or using the RAS of a network service provider. Referring to FIGS. 3 and 4, a modem 110 at a customer premises dials up that customer's ISP. The dial tones corresponding to the dialed number are communicated by a local loop (e.g., twisted copper pair) 120 to a central office switch 350/450 serving the customer. The central office switch 350/450 may then use so-called out-of-band signaling to set up a call between the customer's modem 110 and the ISP's RAS 324/424. Such out-of-band signaling is communicated by a signaling network 380/480, such as SS7 for example. The signaling network 380/480 may use a database to determine how the call will be set up. In accordance with the present invention, the call path goes through a PRI offload device 322/422, rather than an expensive central office switch in the ISP's service area, and is terminated by the remote access server ("RAS") 324/424. A protocol, such as the point-to-point protocol ("PPP") for example, may govern this connection. If possible, tandem switches are avoided, though this is not necessary.

Once the call is set up, the modem 110 can transmit voice band (e.g., ITU-T (International Telecommunications Union—Telecommunications Sector: formerly CCITT) modulation schemes V.32, V.43, V.90, etc.) signals to the central office switch 350/450 over the local loop 120. The central office switch 350/450 may then time-division multiplex the voice band signal, together with other signals, and place the multiplexed signals on an inter-machine trunk ("IMT") 390/490. Typically, the bandwidth of the IMT 390/490 will be greater than that of the local loop, though this is not strictly necessary.

The time-division multiplexed signal may pass through no tandem switches, or one or more tandem switches (not shown). Ultimately, a PRI offload device 322/422 terminates an inter-machine trunk carrying the signal. The inter-machine trunk terminated by the PRI offload device 322/422 may support a service such as DS1 (i.e., 1.544 Mbps), DS3 (44.736 Mbps), etc.

The PRI offload device 322/422 may then convert the received signals into PRI formatted signals. In one embodiment, one PRI service line can carry 24, 64 Kbps signals—23 data and one control. The RAS 324/424 can then convert each PRI service (e.g., line 375a) into (e.g., 23) individual streams of IP protocol packets. The ISP can then pass these IP protocol packets to the Internet. Communications from the Internet back to the modem 110 include a reverse of the conversions listed above.

When the user wants to end their session, the modem, under appropriate control, can request that the central office switch 350/450 terminate the call. The termination of the call should be handled through the signaling network 380/480.

§ 4.4 CONCLUSIONS

As can be appreciated from the foregoing disclosure, the present invention can be used to relieve switches designed and engineered to carry short duration voice telephone calls, from servicing other types of calls (such as modem-based Internet calls) by diverting such calls to a PRI offload device. The present invention helps to ensure security by isolating signaling and data communication. Such isolation may be provided by the use of separate networks, or a network with appropriate firewalls.

What is claimed is:

1. An apparatus for offloading calls to high usage customers, the apparatus comprising:
 a) a converter, the converter including
  i) a first interface for terminating an inter-machine trunk,
  ii) a primary rate interface, and
  iii) means for converting data signals received on the first interface to new data signals for placement on the primary rate interface; and
 b) a signaling interface for establishing a call, through the converter, from a first terminal device to a second terminal device,
  wherein the signaling interface communicates via a signaling network that is isolated and secured from a network for carrying the new data signals using a firewall, and
  wherein messages in the communications network are authenticated with the signaling network by a security gatekeeper function.

2. The apparatus of claim 1 wherein the first interface terminates an inter-machine trunk carrying time-division multiplexed signals.

3. The apparatus of claim 2 wherein at least one of the time-division multiplexed signals is a digitized voice-band signal.

4. The apparatus of claim 1 wherein the new data signals are provided on a line including 24 64-Kbps channels.

5. The apparatus of claim 4 wherein the 24 64-Kbps channels include 23 data channels and one control channel.

6. The apparatus of claim 1 further comprising:
 c) a remote access server coupled with the primary rate interface, the remote access server adapted to terminate data calls.

7. The apparatus of claim 1 further comprising:
 a remote access server coupled with the primary rate interface, the remote access server adapted to terminate modem calls.

8. The apparatus of claim 7 wherein tandem switches are avoided by terminating modem calls by the remote access server.

9. The apparatus of claim 1 further comprising:
 c) a remote access server coupled with the primary rate interface, the remote access server adapted to convert the new data signals to an Internet protocol.

10. The apparatus of claim 9 wherein the remote access server is adapted to be coupled to an Internet protocol network, wherein the Internet protocol network is isolated from the signaling network.

11. The apparatus of claim 10 further comprising:
 firewalls adapted to isolate the Internet protocol network from the signaling network.

12. The apparatus of claim 1 wherein the converter and signaling interface are accommodated on a line card.

13. The method of claim 1 wherein message sequencing in the communications network is insured by one of time-stamping and non-random sequencing to ensure that the message is not a replayed copy of a previous message.

14. A method for servicing a call to a remote access server, the method comprising:
 a) setting up the call, using a signaling network, such that the call passes through a primary rate interface;
 b) converting, using the primary rate interface, the call from a time-division multiplexed signal on an inter-machine trunk to a primary rate signal, wherein the inter-machine trunk is a part of a communications network; and
 c) isolating and securing the communications network from the signaling network using a firewall, wherein messages in the communications network are authenticated with the signaling network by a security gatekeeper function.

15. The method of claim 14 further comprising:
inserting the primary rate signal as data into Internet protocol packets.

16. The method of claim 15 further comprising:
providing the Internet protocol packets to an Internet protocol network,
wherein the Internet protocol network is isolated from the signaling network.

17. The method of claim 14 wherein the call communicates data originating from a modem.

18. The method of claim 14 wherein the call communicates data that is originally expressed as a voice-band signal.

19. The method of claim 14 wherein the call communicates data that is originally expressed as a dual-tone, multiple-frequency signal.

20. The method of claim 14 wherein the act of setting up the call, using a signaling network, such that the call passes through a primary rate interface, permits the call to bypass an egress central office switch.

21. The method of claim 14 wherein the primary rate signal includes 24 64-Kbps channels, and
wherein one of the 23 64-Kbps channels carries the call.

22. An apparatus for offloading calls to high usage customers, the apparatus comprising:
  a) a converter, the converter including
    i) a first interface for terminating an inter-machine trunk,
    ii) a primary rate interface, and
    iii) means for converting data signals received on the first interface to new data signals for placement on the primary rate interface; and
  b) a signaling interface for establishing a call, through the converter, from a first terminal device to a second terminal device,
    wherein the signaling interface communicates via a signaling network that is isolated from a network for carrying the new data signals using a firewall, and
    wherein messages in the communications network are authenticated with the signaling network by a security gatekeeper function,
  wherein the converter and signaling interface are accommodated on a line card.

* * * * *